United States Patent [19]

Bock et al.

[11] 4,220,573
[45] Sep. 2, 1980

[54] NOVEL IONIC POLYMER COMPOSITIONS

[75] Inventors: Jan Bock, Houston, Tex.; Neville G. Thame, Montclair, N.J.; Lowell Westerman, Baytown, Tex.

[73] Assignee: Exxon Research & Engineering Co., Florham Park, N.J.

[21] Appl. No.: 2,787

[22] Filed: Jan. 11, 1979

Related U.S. Application Data

[63] Continuation of Ser. No. 855,549, Nov. 29, 1977, abandoned.

[51] Int. Cl.$^2$ .............................................. C08L 91/00
[52] U.S. Cl. ........................ 260/23.5 A; 260/23.7 R; 260/DIG. 31
[58] Field of Search .......... 260/23.5 A, 23.7, DIG. 31

[56] References Cited

U.S. PATENT DOCUMENTS

| 3,642,728 | 2/1972 | Canter | 260/79.3 R |
| 3,847,854 | 11/1974 | Canter et al. | 260/23.7 M |
| 3,974,241 | 8/1976 | Lundberg et al. | 260/897 B |

Primary Examiner—Lewis T. Jacobs
Attorney, Agent, or Firm—Richard E. Nanfeldt

[57] ABSTRACT

The instant invention relates to unique and novel ionic polymer compositions which are characterized as being processable at high temperatures, for example, 200° C., while retaining adequate physical properties at both room temperature and elevated temperatures which are below the processing temperature. The ionic polymer compositions include a metal neutralized sulfonated polymer which is plasticized with a preferential plasticizer, at a concentration level of about at least 7 parts by weight per 100 parts of the metal neutralized sulfonated polymer. The preferential plasticizer acts to disrupt the ionic association of the metal or ammonium salt groups of the neutralized sulfonated polymer, thus allowing the ionic polymer to act as a noncrosslinked material at the processing temperature. When the composition is in this state, it can be compounded with oils, fillers, etc. The plasticized metal neutralized sulfonated polymer has excellent physical properties at room temperature and up to 100° C. and more than adequate processability at temperatures of from 200° C. and above thereby providing a proper balance of rheological and physical properties. Preferably, the ionic polymer is an ionic elastomer having from 0.2 to 25 mole % pendant acid groups, for example, carboxylic, phosphonic and sulfonic acid groups. Preferably, the pendant acid groups are sulfonic acid groups.

8 Claims, No Drawings

NOVEL IONIC POLYMER COMPOSITIONS

This is a continuation of application Ser. No. 855,549, filed Nov. 29, 1977, now abandoned.

BACKGROUND OF THE INVENTION

1. Field of the Invention

The instant invention relates to unique and novel ionic polymer compositions which are characterized as being processable at high temperatures, for example, 200° C., while retaining adequate physical properties at both room temperature and elevated temperatures which are below the processing temperature, for example, up to 100° C. and more. The ionic polymer compositions include a metal neutralized sulfonated polymer which is plasticized with a preferential plasticizer, at a concentration level of about at least 7 parts by weight per 100 parts of the metal neutralized sulfonated polymer. The preferential plasticizer acts to disrupt the ionic association of the metal or ammonium salt groups of the neutralized sulfonated polymer, thus allowing the ionic polymer to act as a noncrosslinked material at the processing temperature. When the composition is in this state, it can be compounded with oils, fillers, etc. The plasticized metal neutralized sulfonated polymer has excellent physical properties at room temperature and up to 100° C. and more than adequate processability at temperatures of from 200° C. and above, thereby providing a proper balance of rheological and physical properties. Preferably, the ionic polymer is an ionic elastomer having from 0.2 to 25 mol % pendant acid groups, for example, carboxylic, phosphonic and sulfonic acid groups. Preferably, the pendant acid groups are sulfonic acid groups.

2. Description of the Prior Art

U.S. Pat. No. 3,642,728 relates to sulfonated polymer compositions wherein the sulfonate group may be combined with a counterion which is the cation of a neutralization agent. In this patent, the desirability of using mixed salts of stearic acid as neutralization agents is suggested but no specific combinations, nor the results obtained therewith are described.

This patent also suggests combining the compositions disclosed therein with various other polymers including polyolefins. However, in the description of the blends of the polymers described in the patent with polyolefins, it is suggested that the polyolefin constitutes a major portion of said blend.

In U.S. patent application Ser. No. 103,902, filed on Jan. 4, 1971, now abandoned, in the names of Nathan H. Canter et. al., processable ionomers are described which comprises an ionomer in combination with a preferential plasticizer. These materials are prepared by a one-step or two-step neutralization process. However, where the two-step neutralization is taught, the process of neutralization is carried out directly opposite to that described in the instant specification, that is, the ionomer precursor, e.g., the acid form, is contracted with a strong base, e.g., sodium hydroxide which yields an intractable polymer. This material is then combined with a preferential plasticizer which may be a fatty acid derivative of a Group IIA or IIB metal. When the compositions are made in this manner, facile blending is not possible after the first neutralization step. Furthermore, the final product does not have the excellent balance of physical properties at room and elevated temperatures in combination with the ease of processability as the compositions taught in the instant disclosure.

Additionally, the amount of nonvolatile preferential plasticizer is limited to a maximum of 6 wt. %. Canter did not recognize, teach, employ or infer the use of preferential plasticizer at the concentration levels of the instant application thereby allowing compositions to be manufactured which had a proper balance of rheological and physical properties.

U.S. Pat. No. 4,014,831 to J. Bock, N. Thame, and L. Westerman which issued on Mar. 29, 1977 teaches the processes and compositions of the instant invention; however, it does not claim the compositions of the instant invention. The issue date of U.S. Pat. No. 4,014,831 was Mar. 29, 1977 as well as the corresponding German Appln. No. P2621355.8 was open to publication inspection Dec. 2, 1976; therefore these applications do not constitute a statutory bar to the instant application.

SUMMARY OF THE INSTANT INVENTION

The instant invention relates to ionomeric compositions having good processability in combination with good physical properties at both room and elevated temperatures. In the process of making these ionomeric compositions a polymer comprising a polymeric (elastomeric or plastic) backbone having pendant acid groups attached to the polymeric backbone, for example, carboxylic acid, phosphonic acid, sulfonic acid groups is contacted serially with (1) a first neutralizing agent having two components, one component of which comprises a metallic or ammonium cation which combines with the pendant acid group as a metal or ammonium salt thereof and a second component which combines with the hydrogen ions present in said pendant acid groups to form a preferential plasticizer which acts to disrupt the ionic association of the metal or ammonium salt groups, and (2) a second neutralizing agent which converts said preferential plasticizer into a less active form, i.e., a salt having a substantially higher melting point than the preferential plasticizer, whereby an improved composition having good physical properties at both room and elevated temperatures and excellent processability at temperatures near and above the melting point of the salt of the preferential plasticizer is obtained.

The ionic polymer may comprise from 10 to 60 meq. of pendant ($SO_3H$) acid groups in its acid form per 100 g of polymer. More preferably, the ionic polymer will comprise from 15 to 40 meq. acid groups per 100 g of polymer. Preferably, the ionic polymer will have an elastomeric backbone, for example, butyl rubber, polybutadiene, ethylene propylene terpolymer, etc. In general, the compositions taught in U.S. Pat. No. 3,642,728 herein incorporated by reference, in their acid forms, are the preferred ionic polymers for use in the process of the instant invention and in copending application C-470 entitled "Improved Process for Sulfonation of an Elastomeric Polymer" to Henry S. Makowski, Robert D. Lundberg and Jan Bock, whereby C-470 was filed on the same day as the instant application and is hereby incorporated by reference.

Ionic plastics useful in the instant invention may be selected from the group consisting of those having a polystyrene, polyethylene, polypropylene, etc. backbone. Preferably, the ionic plastic is a polystyrene sulfonic acid polymer.

The first neutralizing agent may be selected from the group consisting of Group IA, IIA, IIB, IIIA, (see page B-3, Handbook of Chemistry and Physics. Chemical Rubber Publishing Company, 4th Ed.) or ammonium derivatives of fatty acids, that is, fatty acids having from 10 to 30, preferably from 14 to 22, carbon atoms, for example, magnesium laurate, magnesium stearate, zinc laurate, zinc stearate, barium laurate, barium stearate, alumina stearate, ammonium stearate, tetramethylammonium laurate, etc. This material is combined with the acid form of the ionic polymer at a level of from 0.5 equivalents/equivalent acid to 10 equivalents/equivalent acid groups, preferably from 1 equivalent/equivalent acid to 5 equivalents/equivalent acid. This combination, which comprises neutralization of the acid form of the ionic polymer and plasticization may be carried out neat or in solution. Preferably the polymer will be dissolved in a solvent.

It is important to neutralize a sufficient number of acidic groups such that the resulting composition possesses sufficient thermal stability as to allow subsequent compounding operations. The required number of acidic groups which must be neutralized will depend on the type of neutralization agent employed, the concentration of acidic groups in the polymer, and the temperature history the material will be subjected to during compounding. For example, oil extension at relatively low temperature ($\sim 50°$ C.) can be accomplished with approximately 50% of the acidic groups neutralized while plastic blending involving a fluxing operation at 150° to 175° C. would require essentially complete neutralization. The valence of the cation comprising the neutralization agent is important in determining the extent of neutralization. For example, a neutralization agent comprised of a monovalent cation such as sodium stearate can form only one neutralized species upon completion of the reaction with the acidic groups in the polymer. Thus, one equivalent of neutralization agent per equivalent of acidic groups would be identical to one mole of agent per mole of acidic groups. One equivalent of divalent neutralization agent per equivalent of acidic groups would be one-half mole of divalent metal stearate per mole of acidic groups. A neutralization agent comprised of a divalent cation, such as magnesium stearate, can form two neutralized species upon completion of the reaction with the acidic groups in the polymer. For example, in the case of sulfonic acid groups in the polymer with magnesium stearate as the neutralization agent, a sulfonate-magnesium-carboxylate species as well as a sulfonate-magnesium-sulfonate species can be formed. If the latter species was produced, complete neutralization would be effected; however, if the former species was produced only one-half neutralization would be effected. In a polymeric system due to stearic constraint of the acidic site it is theorized that both species are present to some extent and thus the equivalents level may not determine the extent of neutralization; however, the skilled artisan can determine whether the correct degree of neutralization is obtained by functional measurement, e.g., heat stability at 200° C.

It is critical that the neutralization agent be selected so as to neutralize the acid groups of the polymer to form a metal or ammonium salt thereof and also provide a preferential plasticizer for the neutralized metal or ammonium salt groups formed. Preferential plasticization of materials of this sort have been described in U.S. Serial No. 103,902 cited above and herein incorporated by reference. The teachings of that patent application are applicable to this step of the instant method. Any material that can be converted during the neutralization of the acid form of the ionic polymer into the preferential plasticizer described in that application and additionally comprises a metal ion which can be combined in the salt form of the polymer is within the scope of this method. Further, a two-component mixture comprising, for example, a preferential plasticizer and a neutralizing agent which is not converted into a "permanent" (i.e., one that cannot be functionally removed by physical methods, e.g., volatilization at temperatures of less than about 150° C.) preferential plasticizer during neutralization may also be used in this first neutralization step. For example, magnesium hydroxide and stearic acid can be combined to carry out the first neutralization step. In this case water will be formed which acts as a preferential plasticizer but will be volatilized at a later stage. It is critical, however, that after the first neutralization step is completed an ionomeric composition which comprises at least 50% of the pendant acid groups in a neutralized form, that is, in combination with a metal or ammonium counterions and a preferential plasticizer for the neutralized groups be present in the composition in an amount effective to disrupt the ionic association of the ionic polymer and thus allow the polymer to behave as an uncrosslinked material at processing temperature i.e. about 200° C. In this state, the polymer will be easily combined with fillers, oils and other polymeric materials, for example, other nonionic plastics. An ionic polymer in this combination, that is compounded with sufficient preferential plasticizer to allow facile flow of the polymer at reasonable processing temperatures, e.g., up to 200° C., may be designated a processable ionic polymer composition. In its broadest scope, the process of the instant invention contemplates converting processable ionic polymer combinations of this sort which are known in the art to have poor to mediocre physical properties into compositions showing improved physical properties while maintaining a substantial degree of processability.

In an especially preferred embodiment of the instant invention, the ionic polymer composition will be combined at this point with a crystalline polyolefin. The crystalline polyolefin is combined in a minor amount based on the total blend, for example, the ratio, by weight, of crystalline polyolefin to ionic polymer is from 0.05 to 1, more preferably from 0.2 to 0.80. The polyolefin is characterized as having a degree of crystallinity of at least 25%, preferably at least 40%, as measured by x-ray diffraction techniques. The crystalline polyolefin may be prepared by polymerization of alpha olefins. It is known in the art, for example, that $C_2$ to $C_8$ alpha olefin polymers may be prepared in a crystalline form. The most preferred crystalline polyolefins are polyethylene and polypropylene. These materials will be characterized as having a molecular weight of at least 2,000, preferably at least 10,000, and more preferably at least 20,000. The polyolefin may comprise minor amounts of other monomers, for example, vinyl acetate, methyl acrylate, ethyl acrylate, methyl methacrylate, ethyl methacrylate, etc. Preferably, the crystalline polyolefin will comprise greater than 90% by weight of alpha olefin units.

Both high and low density polyethylene may be used in preparing the compositions of the instant invention, for example, polyethylenes having a density of from 0.91 to 0.97 g/cc are generally included. Polypropylene of either intermediate or high density is also within the scope of the instant invention. These materials will have a density of from 0.88 to 0.925 g/cc. Polyethylene and polypropylene can also be combined in a copolymer so long as an adequate degree of crystallinity is obtained in said combination. Thus, block polymers wherein polyethylene or polypropylene are present in crystalline form are effective.

Another less preferred material which can be utilized in place of or blended with crystalline polyolefin is trans-1,4-polybutadiene.

As stated above, the preferred ionic polymer is the sulfonic acid having a polybutyl or an ethylene-propylene terpolymer backbone. Examples of ethylene-propylene terpolymers include the polymerization product of ethylenepropylene and a nonconjugated diene, said diene having a molecular weight of less than 400, e.g. 1,6-hexanediene, ethylidene-norbornene, etc. These materials may comprise from 45 to 90% ethylene and 10 to 55% propylene and from 2 to 10% of the termonomer. The sulfonated derivatives of polymers comprising ethylene and a nonconjugated diene or propylene and a nonconjugated diene, such as ethylidene-norbornene (ENB), e.g., from 2 to 10 wt. % ENB may be also used as ionic polymers in the process of the instant invention. The above materials are generally prepared by sulfonation, using the techniques described in U.S. Pat. No. 3,642,728 and in copending application C-470 noted above. These materials are unstable, to a large extent, and must be neutralized prior to isolation. After the first neutralization step described above, the material may be subjected to conventional elastomer finishing operations, such as steam stripping to remove hydrocarbon solvent and dewatering or drying in a high temperature volatilization extruder. The product which has undergone the first neutralization step is characterized as having quite low viscosities at elevated temperatures, for example, temperatures of from 125° C. to 200° C., yet have excellent green strength at room temperature. These materials which are substantially similar to those described in U.S. patent application Ser. No. 103,902 described above are deficient in their physical properties, for example, tensile strength, at elevated temperatures, i.e., 100° C. and above. At this point, the compositions are also sensitive to water and are deficient in resistance to bloom or surface exudation when molded objects are prepared from these materials.

Thus, the instant method contemplates a second neutralization step wherein a neutralization agent is contacted with the above-described material at conditions whereby the preferential plasticizer is converted into a material that is no longer capable of disrupting the ionic associations at temperatures of less than about 100° C. For example, the preferential plasticizer is converted into a salt having a higher melting point, i.e., >100° C. The second neutralization agent is preferably selected from the group consisting of the oxides, hydroxides and lower alkoxides and alkanoates of Group IA, IIA and IIB metals. These materials convert the preferential plasticizer which, as described above, is preferably a fatty acid into its respective salt. The anion of these second neutralization agents, which is an oxide, hydroxide or lower alkanoate or alkoxide, for example, $C_1$ to $C_6$ alkanoates and alcoholates, are converted to water, the corresponding alkanoic acid or alcohol, respectively, during the second neutralization step and may be removed from the composition by volatilization. These materials if left behind may also act to disrupt ionic associations and thus the desired results contemplated in the method of the instant invention may not be obtained.

The second neutralization step may be carried out either in solution or preferably in bulk. Either in solution or bulk, the sequence of events must be as follows. First, the acid form of the polymer is combined with the first neutralization agent generating the preferential plasticizer. The resulting system, if desired, is then combined with the compounding additives (plastics, mineral fillers, oil extenders, carbon black, etc.). And lastly, the second neutralization agent is introduced. The preferred method of incorporation involves the use of conventional batch or continuous mixing devices used in the rubber and plastics industry. With a batch mixer such as a Banbury the ionic polymer containing the first neutralization agent is combined with the compounding ingredients and then the second neutralization agent is added. This incorporation of the second neutralization agent is a chemical reaction, the extent of which will depend on the time, temperature and shear employed. It may be advantageous to control the extent of reaction to yield a partial neutralization. This may be accomplished by controlling the time, temperature and shear history of the mixing operation.

For reasons of economy, the second neutralization agent is preferably a hydroxide or oxide.

Preferably, the second neutralization agent is a Group IIA hydroxide or a Group IIB oxide, more preferably, $Ba(OH)_2.8H_2O$, $Mg(OH)_2$ and $ZnO$.

The second neutralization step is selected to form a salt of the preferential plasticizer which has a higher melting point than the preferential plasticizer, and thus will function only at a higher temperature. The salt will have a melting point of at least 10° C., more preferably at least 50° C., higher than the preferential plasticizer (e.g. stearic acid m.p. into zinc stearate m.p.-by addition of zinc oxide).

It will be appreciated by the skilled artisan that the lower melting ammonium and metal salts of fatty acids, e.g., ammonium laurate, zinc stearate, etc., which have melting points of 110° C. and 130° C. respectively may be used as preferential plasticizers which are effective at temperatures of less than 150° C. After compounding these low melting preferential plasticizers may be converted to higher melting salts by combination with, for example, a Group IIA hydroxide or lower alkanoate, e.g., $Mg(OH)_2$. The skilled artisan may thus, by selection of the salt which will remain after the second neutralization step, design an ionic polymer composition having processability at any temperature at or above the melting point of said salt.

The second neutralization agent is combined with the neutralized ionic polymer at a level of from 0.25 equivalents/equivalent of acid group to 10 equivalents/equivalent of acidic groups, preferably from 0.25 to 5. When the first neutralization agent is an ammonium derivative, it generally is desirable to use higher amounts of the second neutralization to displace the ammonium ions that have combined with the acid groups of the ionic polymer with metal cations. The metal cations, especially the divalent cations, form ionic groups which are more strongly associated, thus provide a tightly crosslinked polymer.

It is critical that at least 25% of the preferential plasticizer be converted into a salt with a higher melting point than either the fatty acid generated in situ or a low melting starting salt. This salt, as stated above, is not a preferential plasticizer at the lower temperatures utilized in compounding, etc. That is, at from room temperature up to 100° C. and somewhat above, the salt of the preferential plasticizer should be ineffective for disrupting the ionic associations. The material after the second neutralization step will behave as a crosslinked material at temperatures up to and including 150° C., thus the physical properties of these doubly neutralized materials are outstanding at temperatures in this range. However, it is desirable that the materials even after a second neutralization step should be processable at temperatures of 200° C. and above. Thus, the salt of the preferential plasticizer is preferably selected to disrupt ionic associations at temperatures of from about 50° below to 50° above the temperature at which it is desired to fabricate these doubly neutralized materials.

It has unexpectedly been found that these doubly neutralized materials show excellent processing properties at high temperatures while retaining excellent physical properties at temperatures of up to 100° C. These materials behave as if only the second neutralizing agent is acting at lower temperatures, and the first neutralizing agent, only, is working at elevated temperatures, e.g. >200° C. That is, if the ionic polymers described above were neutralized only with the second neutralizing agent, excellent physical properties would be obtained at room temperature and up to 100° C. However, processability would suffer. When the ionic polymers are neutralized with the first neutralization agent only, excellent processability is obtained, but poor physical properties at elevated temperatures, e.g., 100° C., are obtained.

The doubly neutralized materials prepared by the method of the instant invention have both properties, thus giving the polymer fabricator the best balance of characteristics, i.e., processability and physical properties.

The doubly neutralized materials prepared by the instant method also have the following unexpected advantages; improved water sensitivity, resistance to bloom or surface exudation, and improved thermal, oxidative, and light resistance.

The unique compositions of the instant invention are homogeneous blend of: a metal neutralized sulfonated elastomeric polymers, wherein the SO$_3$H groups are neutralized with a metal cation selected from the group consisting of Groups IA, IIA, IB or IIB, iron, antimony, or lead of the Periodic Table of Elements; and a preferential plasticizer at a concentration level of about 7 to about 50 parts per weight per 100 parts of the metal neutralized sulfonated polymer, more preferably about 7 to about 40, and most preferably about 7 to about 35, wherein the preferential plasticizer is a mixture of metallic salts of a fatty acid wherein the metallic ions of the mixture of metallic salts of the fatty acid are different or a mixture of a fatty acid and a metallic salt of the fatty acid or a different fatty acid, wherein the metal ion of the fatty acid is selected from the group consisting of Groups IA, IIA, IB or IIB, iron, antimony, or lead of the Periodic Table of Elements; for e.g. a mixture of magnesium stearate and zinc stearate; a mixture of stearic acid and zinc stearate.

The following are specific embodiment of the instant invention, which demonstrate the above advantages of the doubly neutralized ionic polymers.

EXAMPLE 1

Effect of Mg(OH)$_2$ addition on physical properties, rheology and water sensitivity of sulfonated ethylene-propylene-ethylidene norbornene terpolymer (sulfonated EPT) blended with a crystalline polyethylene.

A sulfonated EPT neutralized with 3 equivalents zinc acetate-3 equivalents stearic acid was blended with 35% high density polyethylene (HDPE) at 150° C. using a Brabender extruder mixing head. In one case (A), no Mg(OH)$_2$ was added. In the second case (B), 1 equivalent Mg(OH)$_2$ (based on equivalents of stearic acid) was added in the mixing head and in the third case (C), 2 equivalents Mg(OH)$_2$ added.

| Sample | Sulfonate, g | HDPE, g | Mg(OH)$_2$, g |
|---|---|---|---|
| A | 32.5 | 17.5 | 0 |
| B | 32.5 | 17.5 | 0.66 |
| C | 32.5 | 17.5 | 1.32 |

Each blend was removed from the mixing head after 5-6 minutes of mixing and milled on a 3-inch electric mill at 150° C. for 3½ minutes.

Rheology was obtained at 200° C. using the milled sheet.

Micropads (20 mil) were pressed (preheated mold, 3' preheat, 4' press at 20 tons, cooled under 20 tons) and used to obtain stress-strain at 23° C. and 100° C. and water sensitivity in distilled water at 50° C.

Rheology—Instron Capillary Rheometer, 0.050"×1.0" die, 200° C.

As shown in Table I, shear stress increases with the addition of Mg(OH)$_2$. Melt fracture drops from 1469 sec$^{-1}$ with no Mg(OH)$_2$ to 147 sec$^{-1}$ with Mg(OH)$_2$.

TABLE I

| Sample | Shear Stress, dynes/cm$^2$ × 10$^{-5}$ | | | | Melt Fracture |
|---|---|---|---|---|---|
| | 0.75 sec$^{-1}$ | 7.4 sec$^{-1}$ | 74 sec$^{-1}$ | 740 sec$^{-1}$ | Shear Rate, sec$^{-1}$ |
| A (No Mg(OH)$_2$) | 0.94 | 3.6 | 11.3 | 30.0 | DEF @ 1469 |
| B (1 Eq Mg(OH)$_2$) | 2.5 | 8.7 | 26.1 | Pulsates | DEF @ 147 |
| C (2 Eq Mg(OH)$_2$) | 3.7 | 11.4 | 27.9 | 55.4 | SI @ 73, DEF @ 147 |

TABLE II

Tensile - Elongation of Mg(OH)$_2$ Neutralized Blends of Polyethylene and Sulfo-EPT Stress-Strain

| Instron Crosshead Speed 2 In. Per Minute | | | | | | | |
|---|---|---|---|---|---|---|---|
| 23° C. | Tensile psi | | | | | | |
| Sample | 100% | 200% | 300% | 400% | 500% | Break | Elongation % |
| A (No Mg(OH)$_2$) | 816 | 856 | 902 | 1002 | — | 1091 | 458 |
| B (1 Eq Mg(OH)$_2$) | 1045 | 1232 | 1458 | 1392 | 2242 | 2522 | 547 |

TABLE II-continued

Tensile - Elongation of Mg(OH)$_2$ Neutralized Blends of Polyethylene and Sulfo-EPT
Stress-Strain Instron Crosshead Speed 2 In. Per Minute

| 100° C. Sample | Tensile, psi | | | | | Elongation % |
|---|---|---|---|---|---|---|
| | 100% | 200% | 300% | 400% | Break | |
| A (No Mg(OH)$_2$) | 95 | 58 | — | — | 48 | 223 |
| B (1 Eq Mg(OH)$_2$) | 265 | 283 | 310 | 345 | 359 | 443 |
| C (2 Eq Mg(OH)$_2$) | 366 | 412 | — | — | 419 | 217 |

Table II, above, shows the effect of Mg(OH)$_2$ addition on the stress-strain properties of the plastic blended sulfonate polymer. The tensile strength increases with Mg(OH)$_2$ addition at both room temperature and 100° C. The effect of Mg(OH)$_2$ is especially evident at the elevated temperature. In addition, the processability as evidenced by the rheological data of Table I is adequate for such operations as extrusion or compression molding.

A micropad of each sample was placed in distilled water in a capped jar and held at 50° C. Periodic weighings were obtained by removing the pad from water, blotting to remove surface water and weighing the pad quickly. As shown in Table III, the sample with no Mg(OH)$_2$ after 1488 hours has picked up 31.7% water, while the Mg(OH)$_2$ added pads pick up about 7–8% water.

It should be noted that throughout Examples 1 to 4 the sulfonated ethylene propylene terpolymer is prepared by sulfonating a polymer comprising 52% ethylene, 43% propylene, and 5% ethylidene norbornene (Mooney viscosity of ~20) according to the method described in U.S. Pat. No. 3,642,728. The amount of sulfonate groups incorporated is 30 milliequivalents per 100 grams of polymer. The amount of neutralization agent and/or the preferential plasticizer is given in equivalents/equivalent sulfonate (sulfonic acid) group.

TABLE III

Water Sensitivity
In Distilled Water at 50° C.

% Water Weight Pickup

| Hours | No Mg(OH)$_2$ | 1 Eq Mg(OH)$_2$ | 2 Eq Mg(OH)$_2$ |
|---|---|---|---|
| 68 | 4.85 | 3.73 | 3.81 |
| 170 | 7.15 | 4.58 | 4.68 |
| 455 | 11.9 | 5.59 | 5.86 |
| 1488 | 31.7 | 7.16 | 8.05 |

EXAMPLE 2

Effect of Mg(OH)$_2$ addition on physical properties, rheology and water sensitivity of a compounded ionic polymer composition having the following composition: 100 parts sulfonated EPT, 32 phr Mg stearate, 150 phr black, 100 phr oil, which is hereafter designated as Sample K.

To three 50 g samples of K on a cold mill was added 1.1 phr, 2.2 phr and 3.3 phr Mg(OH)$_2$ (Samples D, E and F respectively).

| Sample | K, gms | Mg(OH)$_2$, gms |
|---|---|---|
| D | 50 | 0.159 |
| E | 50 | 0.320 |
| F | 50 | 0.64 |

Test pads were prepared on a press (175° C., 5 min).

Rheology—Instron Capillary Rheometer, 0.050"×1.0" die, 200° C.

As shown in Table IV, a slightly higher shear stress is obtained with Sample E (2.2 phr Mg(OH)$_2$) as compared to K with no change in the melt fracture point.

Water Sensitivity—In Distilled Water at 50° C.

Percent water pickup versus days in water at 50° C. was measured. The average water pickup for the Mg(OH)$_2$ samples after about 14 days is 4.9% as compared to 7.5% for K.

TABLE IV

| Shear Rate sec$^{-1}$ | Rheology Balance | |
|---|---|---|
| | K Viscosity Poise | E Viscosity Poise |
| 0.73 | 5.0 × 10$^5$ | 5.3 × 10$^5$ |
| 15 | 6.8 × 10$^4$ | 7.0 × 10$^4$ |
| 29 | 4.1 × 10$^4$ | 4.2 × 10$^4$ |
| 73 | 2.2 × 10$^4$ | 2.2 × 10$^4$ |
| 146 | 1.5 × 10$^4$ | 1.4 × 10$^4$ |
| 292 | 1.0 × 10$^4$ | 1.1 × 10$^4$ |
| 730 | Fracture | Fracture |

As shown in Table V below, the addition of Mg(OH)$_2$ to the control (K) increases modulus, i.e., tensile stress at a given elongation, at room temperature and decreases elongation. At 100° C. tensile strength increases from 194 psi to 473 psi with the addition of 2.2 phr Mg(OH)$_2$ to K.

TABLE V

| 23° C. Sample | Tensile Stress, psi | | | | | | Elongation % |
|---|---|---|---|---|---|---|---|
| | 100% | 200% | 300% | 400% | 500% | Break | |
| K | 433 | 631 | 811 | 989 | 1107 | 1108 | 517 |
| D | 579 | 774 | 931 | — | — | 1020 | 360 |
| E | 575 | 787 | 974 | — | — | 1063 | 350 |
| F | 567 | 792 | 955 | — | — | 934 | 290 |

| 100° C. Sample | Tensile Strength, psi | Elongation % |
|---|---|---|
| K | 194 | 545 |
| E | 473 | 350 |

Thus, Example 2 demonstrates that the process of the instant invention provides ionic polymer compositions having a good blend of physical properties and processability.

EXAMPLE 3

Effect of Ba(OH)$_2$.8H$_2$O addition on physical properties, rheology and water sensitivity of the control (K).

| Sample | K, g | Ba(OH)$_2$ . 8H$_2$O, g | Water, ml. |
|---|---|---|---|
| G | 110 | 0.8606 (0.5 Eq) | 1.96 |
| H | 110 | 1.2049 (0.7 Eq) | 2.75 |

-continued

| Sample | K, g | Ba(OH)$_2$ . 8H$_2$O, g | Water, ml. |
|---|---|---|---|
| I | 110 | 1.5491 (0.9 Eq) | 3.54 |

The above three sample mixes were prepared as follows. The Ba(OH)$_2$.8H$_2$O plus water were milled into K on a 3×8 inch two roll mill at room temperature. Each mix was then milled for 5 minutes at about 70° to 80° C. and finally for 3 minutes at about 150° C.

Molded pads for rheology (70 mil thick), stress-strain and water sensitivity (20 mil) were prepared (1 minute preheat, 40 minutes press at 160° C.).

TABLE VI

Rheology
Instron Capillary Rheometer 0.050" × 1.0" die, 200° C.

| Sample | Shear Stress, dynes/cm$^2$ × 10$^{-5}$ | | | | Melt Fracture Shear Rate, sec$^{-1}$ |
|---|---|---|---|---|---|
| | 0.74 sec$^{-1}$ | 7.4 sec$^{-1}$ | 74 sec$^{-1}$ | 740 sec$^{-1}$ | |
| K | 3.1 | — | 14.6 | 40.6 | V Sl @ 740 |
| | | | | | DEF @ 1469 |
| G (0.5 Eq Ba(OH)$_2$ . 8H$_2$O) | 3.7 | — | 16.2 | 46.4 | Sl @ 740 |
| | | | | | DEF @ 1469 |
| H (0.7 Eq Ba(OH)$_2$ . 8H$_2$O) | 4.8 | — | 19.1 | 49.5 | Sl @ 295 |
| | | | | | DEF @ 745 |
| I (0.9 Eq Ba(OH)$_2$ . 8H$_2$O) | 5.2 | — | 18.3 | 53.4 | Sl @ 147 |
| | | | | | DEF @ 295 |

Comparing the rheology data as shown in Table VI, it is seen that as the amount of Ba(OH)$_2$.8H$_2$O added to K is increased, a corresponding increase in shear stress and a lowering of the melt fracture point is obtained, however, the compositions are still processable by means of art recognized fabrication techiques.

In Table VII the effect in physical properties of incorporating Ba(OH)$_2$.8H$_2$O added in increasing amounts is measured. At 100° C., modulus and tensile at break increases and elongation is shortened.

EXAMPLE 4

The following example compares a composition (C) prepared by the process of the instant invention wherein the preferential plasticizer is converted to a higher melting point salt after compounding with compositions (A and B) having the same ingredients but the ingredients are not combined in the critical sequence required by the process of the invention, that is, the preferential plasticizer is not converted to a higher melting salt after the compounding step.

Composition A 32.5 grams of a formulated Sulfo-EPT composition, 17.5 grams of HDPE, and 8.1 grams of stearic acid were blended in a Brabender mixing head for 13 minutes at 160° C. and 50 rpm. This blend was placed in a rubber mill and 2.6 grams of zinc acetate were added over a one minute time period while milling at 160° C. After the zinc acetate was completely added, the total blend was milled for an additional 3½ minutes at 160° C. The Sulfo-EPT composition used in this experiment contained 30 milliequivalents of acid groups, and had been neutralized with 3 equivalents of magnesium hydroxide

TABLE VII

Stress-Strain

| 23° C. | Tensile, psi | | | | | | |
|---|---|---|---|---|---|---|---|
| Sample | 100% | 200% | 300% | 400% | 500% | Break | Elongation % |
| K | 433 | 631 | 811 | 989 | 1107 | 1108 | 517 |
| G (0.5 Eq Ba(OH)$_2$ . 8H$_2$O) | 481 | 665 | 812 | 953 | — | 975 | 423 |
| H (0.7 Eq Ba(OH)$_2$ . 8H$_2$O) | 513 | 700 | 850 | — | — | 937 | 370 |
| I (0.9 Eq Ba(OH)$_2$ . 8H$_2$O) | 542 | 702 | — | — | — | 758 | 207 |
| 100° C. | Tensile, psi | | | | | | |
| Sample | 100% | 200% | 300% | 400% | 500% | Break | Elongation % |
| K | 89 | 116 | 141 | 162 | 183 | 194 | 545 |
| G (0.5 Eq Ba(OH)$_2$ . 8H$_2$O) | 301 | 431 | 467 | 561 | — | 571 | 413 |
| H (0.7 Eq Ba(OH)$_2$ . 8H$_2$O) | 278 | 388 | 470 | — | — | 505 | 355 |
| I (0.9 Eq Ba(OH)$_2$ . 8H$_2$O) | 325 | — | — | — | — | 377 | 140 |

As shown in Table VIII, the addition of Ba(OH)$_2$.8H$_2$O has the effect of lowering the water sensitivity of K.

prior to blending. The amount of zinc acetate and stearic acid was sufficient to yield 3 equivalents of the preferential plasticizer zinc stearate.

TABLE VIII

Water Sensitivity
In Distilled Water at 50° C.
% Water Weight Pickup

| Hours | K | (0.5 Eq Ba(OH)$_2$ . 8H$_2$O) | (0.7 Eq Ba(OH)$_2$ . 8H$_2$O) | (0.9 Eq Ba(OH)$_2$ . 8H$_2$O) |
|---|---|---|---|---|
| 18.5 | 2.77 | — | — | — |
| 45.5 | 3.56 | — | — | — |
| 65 | — | 3.00 | 2.75 | 2.39 |
| 88 | — | 3.08 | 3.05 | 2.58 |
| 140 | 4.47 | — | — | — |
| 156 | — | 3.10 | 3.42 | 2.98 |

Blend B was prepared by mixing 32.5 grams of the Sulfo-EPT composition described above with 17.5 grams of HDPE and 4.16 grams (3 equivalents) of zinc stearate on a mill at 160° for 15 minutes.

Blend C was prepared by mixing 32.5 grams of a Sulfo-EPT composition containing 30 milliequivalents of acid groups and 3 equivalents each of zinc acetate and stearic acid with HDPE (17.5 grams). Subsequently 1.98 grams (3 equivalents) of magnesium hydroxide were added to the mix. The total mix was then blended in a mixing head for 8 minutes at 160° C. and 50 rpm. This composition is then milled at 160° C. for 3½ minutes.

Samples were prepared from the above compositions in a manner similar to that described above. These samples were placed in an excess of distilled water, held at 50° C. After 200 hours, Sample B and C both showed about 4.5 wt. % water pickup. Sample A after immersion for the same time period showed 18% water pickup. It is theorized that Sample A wherein stearic acid was added last to the mixture had excess stearic acid which remained after the addition of zinc acetate. Thus, the preferential plasticizer was left in the composition and at the temperature, at which the water sensitivity test was run, allowed disruption of the ionic bonds and the subsequent incorporation of water. Sample B, on the other hand, wherein zinc stearate was added which is also a preferential plasticizer but which has a higher melting point than stearic acid and thus would not function at the temperature at which water sensitivity was measured did not disrupt the ionic bonds. This composition showed a much lesser degree of water pickup. Sample C, of course, which represents a composition prepared by the process of the instant invention contained magnesium stearate after the compounding. This salt has a much higher melting point than either stearic acid or zinc stearate, and thus shows low water sensitivity at 50° C. If the water sensitivity tests were carried out at 100° C., differences between Sample B and C would be evident since at temperatures in this range the zinc stearate preferential plasticizer would act to disrupt the ionic associations of the polymer and thus decrease the water sensitivity of Sample B.

These three samples were tested for room temperature stress-strain properties. The results are given in Table IX below. Note that at room temperature stress-strain properties of all the samples are substantially equivalent. The stress-strain testing was repeated at 100° C. It is noted that Sample C which represents a composition prepared by the process of the instant invention showed greatly increased stress-strain properties at this temperature. Again, Sample A and B, having stearic acid and zinc stearate remaining in the composition to act as a preferential plasticizer at temperatures of about 100° C., showed the decreased stress-strain properties which are characteristic of a system which is not highly crosslinked, that is the ionic association of the neutralized acid groups are disrupted by zinc stearate and stearic acid at temperatures of about 100° C. See Table X below.

The three samples were tested for compression set at room temperature. This experiment was carried out in a manner similar to that described above. Note that Sample C, which represents a sample prepared by the process of the instant invention, has better compression set properties at room temperature. See Table IX below. The compression set experiment was repeated at 70° C.

Again, Sample C showed improved compression set properties. See Table XII below.

The melt rheology of the three samples were measured as described above. These results are reported in Table XIII below. Note that C has a higher viscosity but is sufficiently similar to Sample A and B as to be processable by methods known in the art.

TABLE IX

| | Room Temperature Stress-Strain | | |
|---|---|---|---|
| Sample | 100% Modulus psi | Tensile psi | Elongation % |
| (C) Control (Mg(OH)$_2$) last | 993 | 2615 | 637 |
| (A) Zn(OAc)$_2$—STCOOH last | 956 | 3056 | 600 |
| (B) ZnSt$_2$ last | 1003 | 2943 | 523 |

Stress-strain at room temperature comparable for all three systems.

TABLE X

| | 100° C. Stress-Strain | | | |
|---|---|---|---|---|
| Sample | Yield | 100% Modulus psi | Tensile psi | Elongation % |
| (C) Control (Mg(OH)$_2$) last | — | 254 | 303 | 330 |
| (A) Zn(OAc)$_2$—STCOOH last | 144 | 132 | 123 | 497 |
| (B) ZnSt$_2$ last | 155 | 143 | 165 | 520 |

"Control" (Mg(OH)$_2$) last clearly has higher modulus and tensile at 100° C.

TABLE XI

| | Compression Set Room Temperature | | |
|---|---|---|---|
| Sample | 30 Minutes | 24 Hours | 4 Days |
| (C) Control (Mg(OH)$_2$) last | 48.7 | 26.6 | 22.1 |
| (A) Zn(OAc)$_2$—STCOOH last | 56.0 | 30.3 | 24.8 |
| (B) ZnSt$_2$ last | 55.7 | 30.2 | 25.5 |

"Control" (Mg(OH)$_2$) last has lower compression set at room temperature.

TABLE XII

| | Compression Set 70° C. | |
|---|---|---|
| Sample | 30 Minutes | 24 Hours |
| (C) Control (Mg(OH)$_2$) last | 87 | 84.1 |
| (A) Zn(OAc)$_2$—STCOOH last | 93.8 | 91 |
| (B) ZnSt$_2$ last | 91.8 | 88.1 |

"Control" (mg(OH)$_2$) last shows a 5-7% lower set at 70° C.

TABLE XIII

| | Rheology Summary Sheet | | | | |
|---|---|---|---|---|---|
| Temperature 200° C. Brabender Mixed Sample | Samples Molded For 3' At 350° F. Shear Stress, dynes/cm$^2$ × 10$^{-5}$ | | | | Die 0.050" × 1.0074" L Melt Fracture Shear Rate, sec$^{-1}$ |
| | 0.74 sec$^{-1}$ | 7.4 sec$^{-1}$ | 74 sec$^{-1}$ | 740 sec$^{-1}$ | |
| A | 1.6 | 5.9 | 18.2 | 48.8 | DEF @ 1469 |
| B | 2.0 | 6.6 | 21.3 | Pulsates | DEF @ 735 |
| C | 3.1 | 11.6 | 32.0 | Pulsates | Sl @ 147 DEF @ 295 |

EXAMPLE 5

One hundred grams of an EPDM terpolymer containing about 50 wt. % ethylene, 45 wt. % propylene and 5 wt. % 5-ethylidene-2-norbornene and having a Mooney viscosity (ML, 1+8, 212° F.) of about 20 was dissolved under agitation in 1000 ml. of n-hexane at 40° C. The resultant cement was cooled to room temperature and 5.74 ml. of acetic anhydride (60.75 mmoles) was then added. While stirring the mixture, 2.1 ml. of 95% H$_2$SO$_4$ (37.5 mmoles) was added dropwise. The sulfonation reaction was quenched after 30 minutes with 150 ml. of isopropanol. The acid form of the sulfonated polymer was analyzed by Dietert Sulfur Analysis to have 33 meq. of SO$_3$H groups per 100 grams of sulfonated polymer. To the quenched sulfonated cement was added with stirring for thirty minutes 25.6 grams (90 mmoles/100 grams of EPDM) of stearic acid. A solution of 9.87 grams (90 meq./100 g of EPDM) of zinc acetate dihydrate dissolved in 25 ml. of distilled water was then added to the cement and stirred for an additional 30 minutes. Antioxidant 2246 (0.5 grams) was then added to the cement. The resultant plasticized, neutralized sulfonated EPDM was then isolated by steam stripping and drying on a rubber mill at 220° F. This material is designated "A".

To a Brabender mixing head set at 150° C. was added 56.8 grams of A. After fluxing 0.81 grams of zinc oxide (Protox 166) was added and mixing continued for 6 minutes. This composition (B) was then sheeted on a two roll mill set at 120° C. for 3.5 minutes.

Tensile properties on micro dumbbells were determined at both room temperature and at 70° C. with an Instron TM model at the rate of 2 inches/minute. Melt index was determined at 190° C. and 250 psi. (ASTM 1238-70, Condition J).

The results are shown in Table XIV.

TABLE XIV

| Properties | Composition A | Composition B |
|---|---|---|
| At Room Temperature | | |
| 100% Modulus (psi) | 225 | 286 |
| 300% Modulus (psi) | 450 | 592 |
| Tensile Strength (psi) | 1895 | 3996 |
| Elongation (%) | 550 | 617 |
| At 70° C. | | |
| 100% Modulus (psi) | 85 | 162 |
| 300% Modulus (psi) | 110 | 210 |
| Tensile Strength (psi) | 205 | 525 |
| Elongation (%) | 650 | 713 |
| M.I. (190° C., 250 psi) | 2.2 | 1.9 |

The physical properties of Composition B (containing zinc oxide) are superior to Composition A (no zinc oxide) at both room temperature and 70° C. as shown in Table XIV. The flow properties as indicated by the melt index are essentially unchanged. Thus compositions consisting of identical first and second neutralization cations, namely, zinc, can effect the unexpected improvements in physical properties embodied by this invention.

What is claimed is:

1. A polymeric composition, which consists essentially of a homogeneous blend of:
   (a) an ionic polymer having about 10 to about 50 meq. of pendent metal neutralized sulfonate groups affixed to an elastomeric polymeric backbone, said sulfonate groups being neutralized with an ammonium or metal cation selected from the group consisting of Groups IA, IIA, IB and IIB, iron, antimony and lead of the Periodic Table of Elements, said elastomeric backbone being selected from the group consisting of Butyl rubber and EPDM terpolymers; and
   (b) a preferential plasticizer at a concentration level of about 7 to about 50 parts by weight per 100 parts by weight of said ionic polymer, said preferential plasticizer being a mixture of a fatty acid and at least one metallic salt of said fatty same acid, said mixture consisting of at least 25 wt. % of at least one said metallic salt of said fatty acid, said metallic salts having different metallic cations, and said fatty acid having about 10 to about 30 carbon atoms.

2. A polymeric composition according to claim 1, wherein said metallic cation is selected from the group consisting of Groups IA, IIA, IB and IIB, iron, antimony, and lead of the Periodic Table of Elements.

3. A polymeric composition which consists essentially of a homogeneous blend of:
   (a) an ionic polymer having about 10 to about 50 meq. of metal neutralized sulfonate groups affixed to a plastic polymeric backbone, said plastic polymeric backbone being selected from the group consisting of polystyrene, polyethylene and polypropylene, said metal neutralized sulfonate groups containing a metal counterion selected from the group consisting of Groups IA, IIA, IB and IIB and iron, antimony, and lead of the Periodic Table of Elements; and
   (b) a preferential plasticizer at a concentration level of about 7 to about 50 parts by weight per 100 parts by weight of said ionic polymer, said preferential plasticizer being a mixture of a fatty acid and at least one metallic salt of same fatty acid, said mixture consisting of at least 25 wt. % of at least one said metallic salt of said fatty acid, said metallic salts having different metallic cations, and said fatty acid having about 10 to about 30 carbon atoms.

4. A polymeric composition according to claim 3 wherein said metallic cation is selected from the group consisting of Groups IA, IIA, IB and IIB, iron, antimony and lead of the Periodic Table of Elements.

5. A polymeric composition according to claims 1 or 2 wherein said fatty acid is stearic acid.

6. The composition according to claim 3, wherein said ionic polymer is a sulfonated polystyrene.

7. A polymeric composition according to claims 6, 3 or 4, wherein said fatty acid is stearic acid.

8. A polymeric composition according to claims 1 or 2, wherein said elastomeric backbone is said EPDM terpolymer.

* * * * *